United States Patent [19]

O'Hare

[11] Patent Number: 4,465,573
[45] Date of Patent: Aug. 14, 1984

[54] METHOD AND APPARATUS FOR THE PURIFICATION OF WATER

[76] Inventor: Harry M. O'Hare, 11150 Walnut, El Monte, Calif. 91731

[21] Appl. No.: 263,038

[22] Filed: May 12, 1981

[51] Int. Cl.³ ............................................. B01D 57/02
[52] U.S. Cl. .................................. 204/180 P; 204/301
[58] Field of Search .............. 204/180 P, 151, 290 K, 204/301

[56] References Cited

U.S. PATENT DOCUMENTS

| | | | |
|---|---|---|---|
| 2,502,614 | 4/1950 | Zender | 210/8.5 |
| 2,546,254 | 3/1951 | Briggs | 204/263 |
| 2,694,680 | 11/1954 | Katz et al. | 204/180 |
| 2,735,812 | 2/1956 | Van Hoek | 204/301 |
| 2,756,202 | 7/1956 | Clarke | 204/151 |
| 2,758,083 | 8/1956 | Van Hoek et al. | 204/301 |
| 2,763,607 | 9/1956 | Staverman | 204/131 |
| 2,796,395 | 6/1957 | Roberts | 204/151 |
| 2,799,638 | 7/1957 | Roberts | 204/151 |
| 2,812,300 | 11/1957 | Pearson | 204/151 |
| 2,906,685 | 9/1959 | Stoddard et al. | 204/264 |
| 2,938,849 | 5/1960 | Stoddard | 204/263 |
| 2,980,598 | 4/1961 | Stoddard | 204/151 |
| 3,006,828 | 10/1961 | Gaysowski | 204/151 |
| 3,073,774 | 1/1963 | Roberts et al. | 204/301 |
| 3,074,864 | 1/1963 | Gaysowski | 204/151 |
| 3,149,061 | 9/1964 | Parsi | 204/180 |
| 3,180,815 | 4/1965 | Kollsman | 204/131 |
| 3,192,142 | 6/1965 | Vellas et al. | 204/149 |
| 3,239,442 | 3/1966 | Tirrell | 204/180 P |
| 3,463,707 | 8/1969 | Gibson et al. | 204/290 K |
| 3,637,482 | 1/1972 | Vajda | 204/228 |
| 3,645,584 | 2/1972 | Gilliland | 204/301 |
| 3,682,806 | 8/1972 | Kinsella et al. | 204/181 |
| 3,764,499 | 10/1973 | Okubo et al. | 204/151 |
| 3,801,488 | 4/1974 | Okuhara et al. | 204/252 |
| 3,869,376 | 3/1975 | Tejeda | 204/180 P |
| 3,901,781 | 8/1975 | Passino et al. | 204/301 |
| 3,975,246 | 8/1976 | Eibl et al. | 204/180 P |
| 4,032,452 | 6/1977 | Davis | 204/180 |
| 4,265,728 | 5/1981 | Suchanski et al. | 204/290 K |

Primary Examiner—Howard S. Williams
Attorney, Agent, or Firm—Lyon & Lyon

[57] ABSTRACT

An electrodialysis purifier system employing an anode, cathodes, water streams, waste streams and ion exchange membranes therebetween. Ion exchange beads are contained within the water streams and waste streams primarily for conductivity control. Screens support the membranes for increased longevity and ribs are so positioned within the element to resist differential pressures encountered. Ion exchange sites are employed throughout the system to increase the dissociation of water into its component ions. Such sites also aid in reducing scale formation. A buffer zone is provided around the cathodes to separate hydroxyl ions from positive ions which would otherwise combine to form scale. Alignment tubes provide the dual purpose of conveying water to various locations throughout the purifier and provide alignment to the various sections. In the overall water purification system, anolyte may be removed from the purifier, filtered through activated charcoal and then employed as both water stream and waste stream influent. A second actvated charcoal filter may be employed after the purifier to extract harmful materials which may be created within the purifier itself.

52 Claims, 19 Drawing Figures

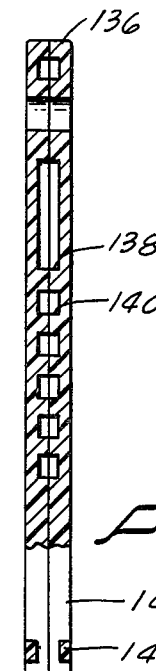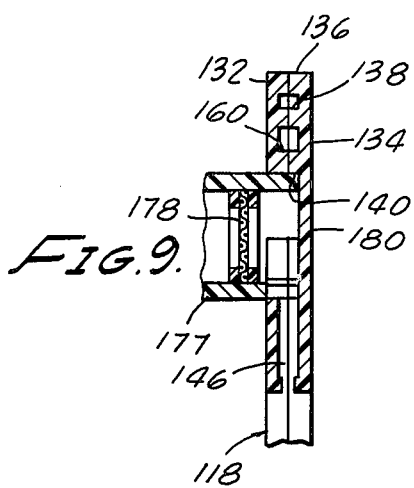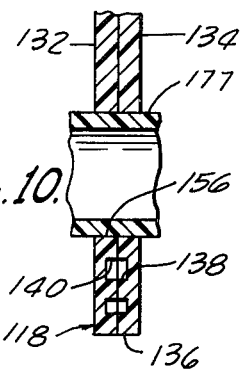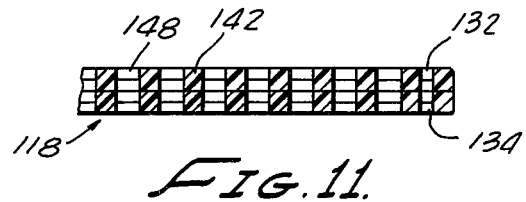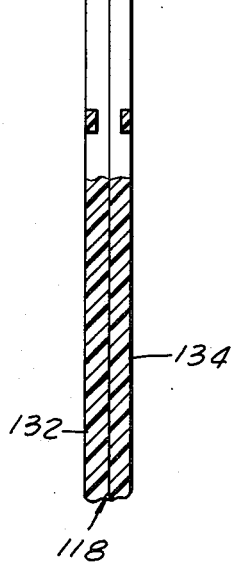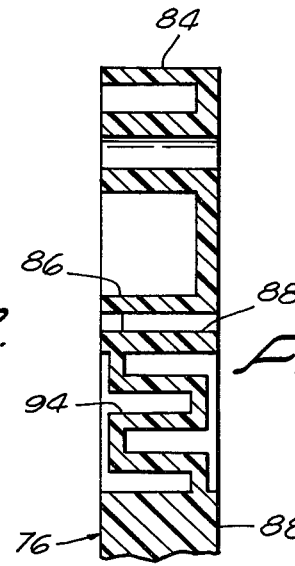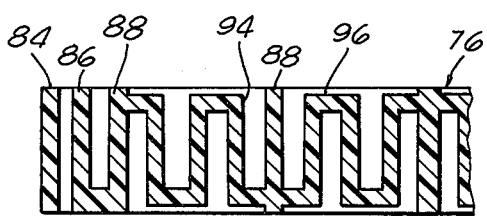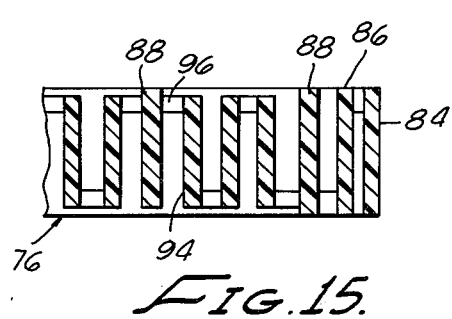

METHOD AND APPARATUS FOR THE PURIFICATION OF WATER

BACKGROUND OF THE INVENTION

The field of the present invention is water purification systems and specifically systems employing electrodialysis.

Water purification can be accomplished in a plurality of different systems for a plurality of different end results. For drinking water purposes, purification may require the removal of substantial amounts of ions contained within brakish or salt water, may require the removal of turbidity and large particles, and may require the destruction of living organisms. Suspended particle filters have long been available and include filter media of sand, charcoal, diatomaceous earth, fine mesh screens and filter membranes. Activated charcoal is often used because of its ability to remove objectionable taste and smell from drinking water. These types of filters are not able to filter ions from the water or insure the removal of harmful living organisms. Furthermore, these filters are of a type which physically collect the suspended solid material. Therefore, they require periodic replacement or cleaning.

To insure against contamination by living organisms in drinking water, a toxic material is often employed. In the United States, chlorine gas is commonly used. It has also been found in the use of certain electrodialysis equipment that the current will kill such organisms.

For removal of ions, two basic systems have found commercial acceptance. Electrodialysis employs a water path, waste paths on either side of the water path, and electrodialysis membranes between these paths. A voltage is induced across these paths such that the negative ions or anions will move toward the positive anode from the water stream, through the electrodialysis membrane to the waste stream for removal. Simultaneously, positive ions or cations move toward a cathode from the water stream through a second electrodialysis membrane into second waste stream for removal. Such electrodialysis mechanisms work quite well but do encounter an inherent difficulty. As the ions are removed from water, fewer and fewer ions are available for conduction of current between the anode and cathode. Consequently, higher and higher voltage requirements are needed to continue to remove the ions.

A further difficulty encountered in electrodialysis is the formation of scale. Scale is developed when the ions contained within the purification system are found in such concentration that they come out of solution. This phenomenon is experienced primarily where there is a high concentration of hydroxyl ions. Such salts as sodium hydroxide commonly form the scale. Because of this formation, it has been considered a requirement of electrodialysis purification that the equipment must be periodically cleaned of such scale buildup. As a result, only very large commercial units of this type have been attempted. Only on a large scale can the labor required for cleaning be justified.

The second common ion removal system employs ion exchange resins, generally in the form of beads, over which the water to be purified is passed. The ion exchange beads have ion exchange sites chemically grafted on their surface which are either anionic or cationic for attraction and adherence of anions and cations. With use, ion exchange devices use up the available sites and the device must be regenerated. Different systems have different methods of regeneration. With common soft water services, the container of such resins is simply replaced, the spent container being removed for renewal. In automatic systems, for a specific period of time, saturated salt solutions are passed through the resin to exchange out the other chemicals.

Two difficulties are encountered with the use of such regenerative ion exchangers. First, a large quantity of salt is dumped into the sewer system by such devices. In the average home unit, over two hundred pounds is so discharged per year. A second difficulty is the excessive presence of sodium ions in the product water. As sodium ions are released in exchange for the hardness ions which are removed in such systems, they are discharged with the product water and are considered unhealthful in excessive amounts.

Other practical difficulties are encountered with a variety of the ion exchange systems available. The high cost of anode materials such as platinum in electrodialysis equipment is disadvantageous. The chemicals needed for cleaning and regenerating systems create practical problems either because of their chemical nature or simply because of the frequency with which they must be used. As mentioned above, descaling is a problem, both because it is labor intensive and requires a shutdown of the unit. The frequency of service may be lessened by increasing the size of the system. However, obvious practical tradeoffs exist in handling and placement of larger systems. Thus, a need for a continuously operating system not requiring regeneration and not requiring frequent cleaning has long existed.

SUMMARY OF THE INVENTION

The present invention is directed to improved water purification systems, both method and apparatus, and the components therefor. The present invention contemplates a system not requiring an independent process for resin regeneration, not requiring frequent cleaning and scale removal, and not requiring frequent filter replacement. At the same time, the present invention contemplates a system for removing ions and destroying water-borne living organisms inexpensively and conveniently. Certain aspects of the present invention also include the most advantageous removal of turbidity and larger particles. The capital expenditure for such systems is also reduced through novel low-cost components and increased system longevity. Furthermore, harmful ions are not purposely deposited in either the product water or the sewer.

To accomplish the foregoing, a system is employed which combines the concept of electrodialysis with ion exchange systems. The combination is so employed in the present invention that the ion exchange resins aid the electrodialysis system by providing enhanced conductivity particularly useful as the water becomes more and more free of such ions. On the other hand, the electrodialysis mechanism aids in helping to regenerate the resins through dissociation of water into hydrogen and hydronium cations and hydroxyl anions. A continually regenerating system is established with these mechanisms of the purifier system working in combination to effectively remove the required ions from the water.

One aspect of the present invention also contemplates the creation of a lethal environment for bacteria and other living organisms in the water being purified. To accomplish this, a first pass of the water to be purified is made directly over the anode. Some chlorine gas is generated from the ever present chloride ions in the water. The dissolved chlorine gas acts to kill the living organisms in the water. Under certain conditions, a holding tank may be employed to give the dissolved chlorine sufficient time to oxidize such harmful organisms. The presence of current in the system also acts to oxidize such organisms, thereby adding to this lethal environment.

In another aspect of the present invention, turbidity filters are employed in such a way that they are at least partially protected from living organisms which enter the system. First, a sand filter is employed. The water is then passed over the anode which causes oxidation of living material. The resulting anolyte is then passed through a first turbidity filter that is somewhat protected by this upstream processing.

The use of anolyte treated through activated charcoal is also advantageous to the present system because organisms are oxidized in the presence of chlorine and yet the ion exchange resins are not harmed by excessive chlorine in the incoming water to the purifier. By taking the water to be processed into the anode of the purifier and then out of the purifier to the activated charcoal filter, the best of both worlds are achieved, the presence of chlorine for oxidation of organisms and the absence of significant amounts of chlorine to avoid ion exchange resin oxidation. A holding tank between the anode and the filter may be used to further enhance the usefulness of the chlorine generated by electrolysis at the anode.

Protection for a second turbidity filter employed downstream of the electrodialysis device may also be achieved. By the time the product water reaches the second turbidity filter, it is very clean. Among other things, a major portion of the chlorine has been removed. Thus, the latter filter experiences extended longevity. The second turbidity filter is also uniquely beneficial to the purifier system in that it removes any harmful material generated by chance within the purifier.

The system of the present invention includes as a further aspect extended longevity of the electrodialysis membranes. Screens are provided on either side of each membrane to reduce the structural and erosive forces normally experienced in electrodialysis equipment. Such screens are also useful for the reduction of scaling of the waste streams through control of the concentration of hydroxyl ions adjacent the membranes. To this end, the screens positioned on either side of the membranes have two specific features. First the interstices in the screen fabric are small enough so that the ion exchange beads, generally available as 50 mesh beads, cannot pass through directly to the membranes. The fine mesh combines with the inherent structure of the screen to physically protect the membranes. Second, the screens are treated by grafting ion exchange sites thereto. These sites may be opposite in sign to the sites on the electrodialysis membranes and help establish an environment, particularly at the waste stream side of the anionic membranes, which prevents the formation of scale.

Also contemplated by the present invention is the protection of the area of the purifier around the cathodes from scale. The catholyte at each cathode is isolated by a unique buffer zone which prevents the hydroxyl ions generated therein from either passing into other areas of the purifier or from combining with substantial amounts of positive ion to form salt scale on the cathodes or adjacent membranes. A combination of anionic and cationic membranes form the buffer zone to isolate the scale forming hydroxyl ions. The waste streams in this buffer zone are also designed to promptly carry away ions to retain a low concentration thereof. The catholyte streams are directed immediately to waste and anolyte of lowered pH is supplied fresh to the cathodes and to the next adjacent waste streams.

In yet another aspect of the present invention, ion exchange resins containing specific ion exchange sites are carefully selected in conjunction with the ion exchange membranes to provide increased water dissociation for proper current control. Such exchange sites are also incorporated on the screens surrounding the membranes, as noted above, and on the walls of the purifier for increased efficiency of water dissociation and ion dispersion.

The structural nature of the preferred embodiment incorporating the several aspects of the present invention also provides an efficient, low cost system having great longevity, requiring infrequent maintenance, and providing reliable performance. Ribs are employed in each stream to enhance hydraulic residence time and to provide composite structural members to resist failure by compressive loading. Extensive use of plastic reduces cost and enhances performance. A new anode material is employed to increase voltage and reduce anode substrate oxidation without the use of expensive platinum.

Accordingly, it is a primary object of the present invention to provide an improved water purifier system including a method for such purification, apparatus therefor, and specific advantageous components. Other and further objects and advantages will appear hereinafter.

BRIEF DESCRIPTION OF THE DRAWINGS

FIG. 8 is a cross-sectional side view taken along line 8—8 of FIG. 5.

FIG. 9 is a cross-sectional side view taken along line 9—9 of FIG. 5.

FIG. 10 is a cross-sectional side view taken along line 10—10 of FIG. 5.

FIG. 11 is a cross-sectional view taken along line 11—11 of FIG. 5.

FIG. 12 is a cross-sectional side view taken along line 12—12 of FIG. 6.

FIG. 13 is a cross-sectional side view taken along line 13—13 of FIG. 6.

FIG. 14 is a cross-sectional view taken along line 14—14 of FIG. 6.

FIG. 15 is a cross-sectional view taken along line 15—15 of FIG. 6.

DETAILED DESCRIPTION OF THE PREFERRED EMBODIMENT

Figure 1:
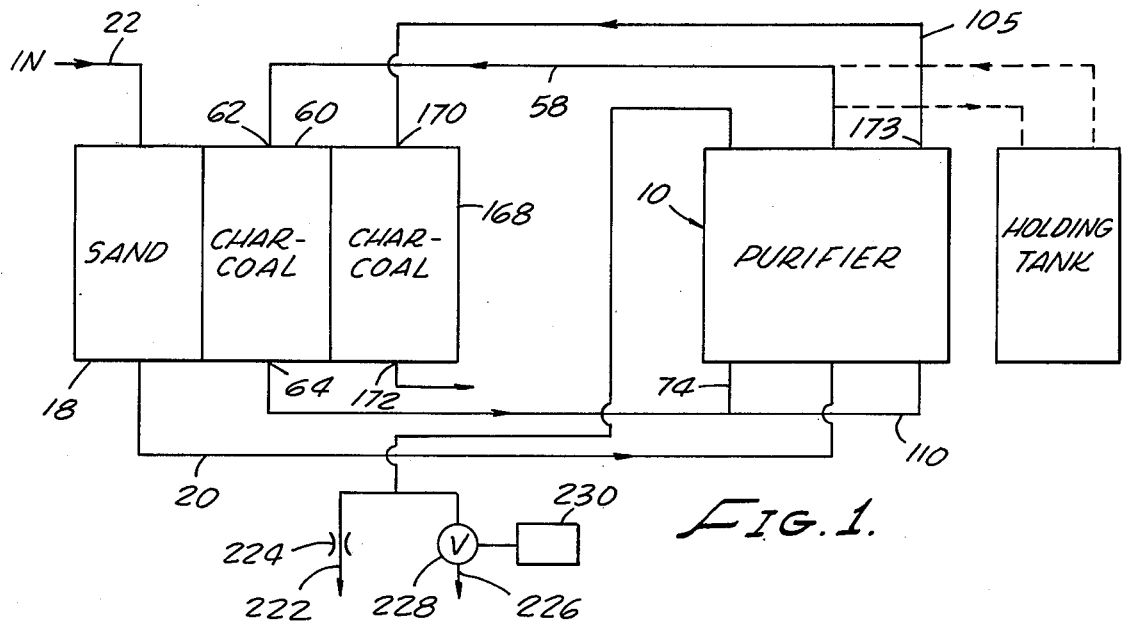
FIG. 1 is a schematic illustration of an entire system according to the present invention.

Turning in detail to the drawings, a plurality of systems are disclosed each providing certain advantages. Several aspects of the present invention are incorporated into each system and may be used independently as well as in combination. A preferred embodiment of a first overall system is illustrated in FIG. 1 and a preferred electrodialysis purifier of the present invention is illustrated in schematic in FIG. 2. A more structural view is provided in the exploded assembly of FIG. 3. The electrodialysis purifier, generally designated 10, includes an anode 12 centrally located in the purifier. On either side of the anode 12 and spaced to the outer sides of the purifier are two cathodes 14 and 16. Between the anode 12 and each of the cathodes 14 and 16, a water stream path and waste stream paths are positioned adjacent one another and separated by screens and electrodialysis membranes. Ion exchange resins are employed in the open areas of certain of these paths.

Taking the system progressively as seen by the incoming water, prior to the purifier 10, a sand filter 18 is employed to separate the larger particulate matter suspended in the influent. The sand filter is in hydraulic communication with the anode 12 through passageway 20 and receives input through an inlet 22 to the sand filter. It is contemplated that conventional sand filtering equipment is to be employed in association with the present invention.

The anode 12 is of expanded metal grid construction to provide a broad anode surface extending as far as practical to cover the cross section of the purifier 10,. For purposes of manufacture and assembly, the anode 12 is split into two segments 24 and 26 electrically connected together. Conventional anodes are typically plated with platinum. To provide a less expensive, efficient anode, the expanded metal anode of the present invention is constructed from a base of niobium. The niobium is carefully plated with passive metal oxide such as lead or manganese dioxides for proper conductivity and inertness. The use of niobium allows a voltage of up to around 120 volts D.C. where conventional titanium substrates allow voltages only up to around 12 volts D.C. before the substrate is oxidized. The oxides are also cheaper than conventional platinum plating.

Figure 7:
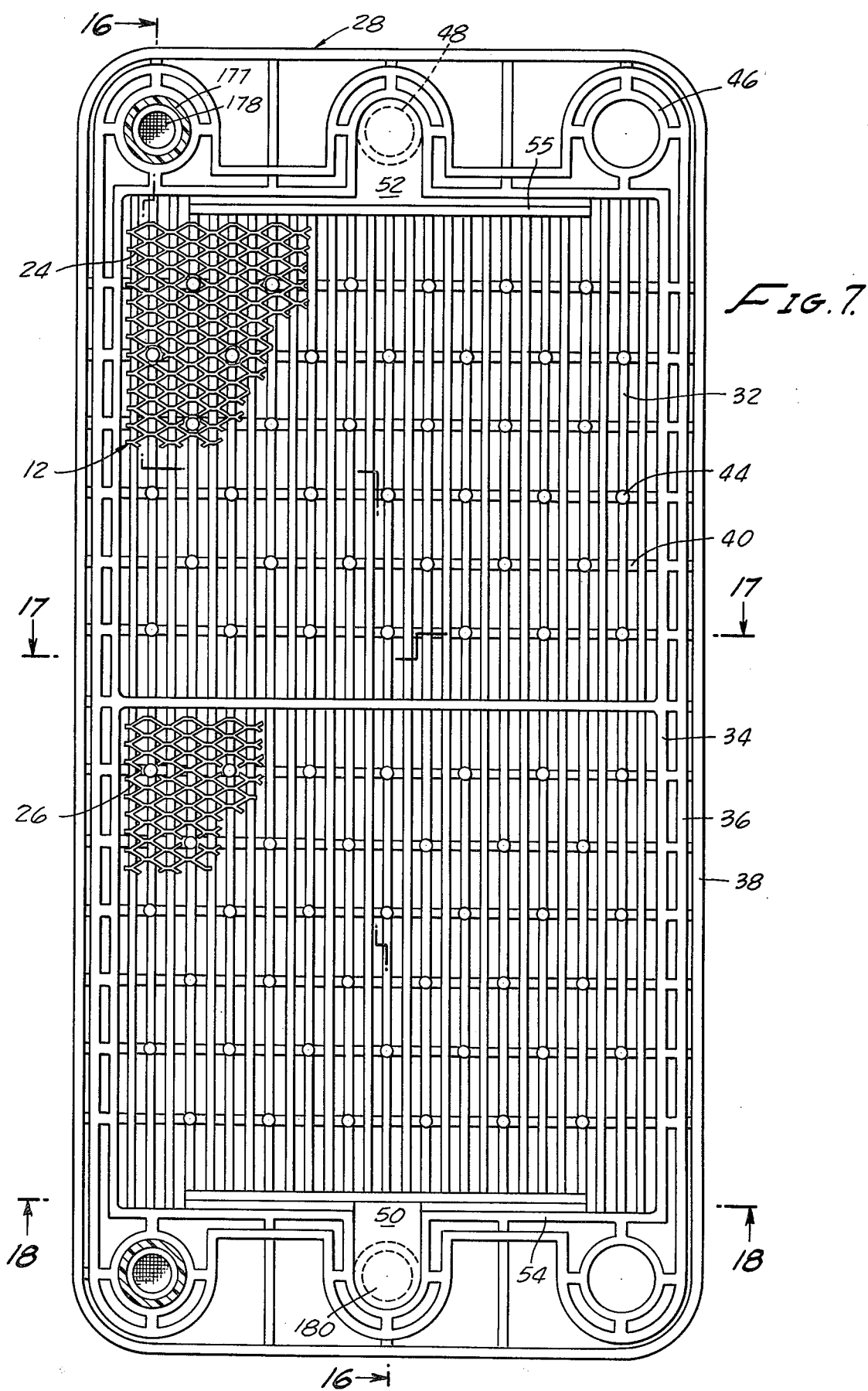
FIG. 7 is an anolyte stream member illustrated in plan of the purifier of FIG. 2.
Figure 17:
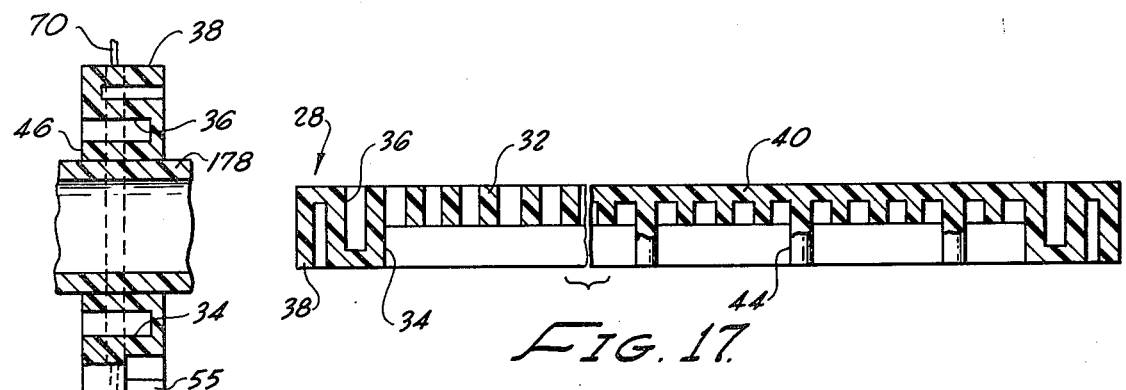
FIG. 17 is a cross-sectional view taken along line 17—17 of FIG. 7.
Figure 18:
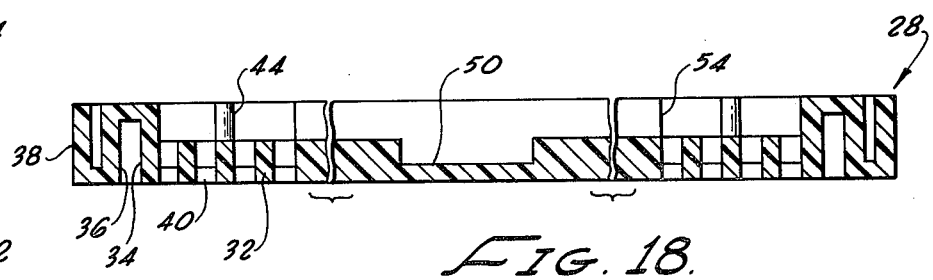
FIG. 18 is a cross-sectional view taken along line 18—18 of FIG. 7.

The anode segments 24 and 26 are contained within an anolyte stream member 28 as best seen in FIG. 7. This member 28 is of molded plastic and includes for sake of convenience in fabrication and assembly a waste stream member 30, the structure of which will be more fully described below. The waste stream member 30 is considered a part of the anolyte stream assembly because no electrodialysis membrane is positioned between the anode and this member 30. Thus, anolyte is able to flow either through the anode 12 or through the member 30. A fine mesh screen 31 therebetween does, however, reduce flow in the member 30. The member 30 is also blocked from communication with the waste stream system.

The anolyte stream member 28 is found to be in a planar arrangement and has ribs 32 running substantially the length thereof in a mutually parallel fashion. As can be seen by the cross section of FIG. 16, the ribs 32 do not extend across the thickness of the anolyte stream member 28. Thus, space is provided for the anode segments 24 and 26.

The ribs 32 are located on the side of the anode member most adjacent the inlet side of the purifier 10 for added structural resistance to differential pressures which is higher on the inlet side of the unit encountered when the water outlet is opened. The waste stream member 30 is located on the side of the anolyte stream member spaced from the ribs 32. The ribs 32 are also spaced one from the other to provide for ion flow between the ribs perpendicular to the plane of the anolyte stream member 28.

Surrounding the anode cavity and ribs are a plurality of continuous walls 34, 36 and 38. These walls 34, 36 and 38 will mate with successive elements of the purifier 10 to form an efficient water seal. Running in a perpendicular fashion to the anolyte ribs 32 are tie ribs 40. The tie ribs 40 operate to prevent the outer walls from expanding outwardly under the pressure of water contained within the purifier. The tie ribs 40 also insure proper location of the anolyte member ribs 32 as they are to be aligned with the ribs of successive members to prevent collapse of the unit from its end under differences in internal pressures. To aid in preventing such a collapse, support posts 44 extend through the anode cavity to the full thickness of the anolyte stream member 28, provision being made for such support posts 44 in the anode 12.

The integral plastic structure forming the anolyte stream member 28 also includes four tubes 46 located at the corners of the unit. These tubes are employed for water and waste stream communication not specifically associated with the anode. Centrally located in the ends of the anolyte stream member 28 are two tubes 48. These tubes 48 are employed for conveying water into the anolyte stream member 28 from one end and conveying anolyte out of the anolyte stream member 28 from the other. An anolyte inlet 50 extends from a first of the tubes 48 into the anode chamber while an anolyte outlet 52 collects and discharges the anolyte stream.

To enhance uniform residence time of the anolyte within the anolyte stream member 28, manifold baffles 54 and 55 spread the anolyte across the anode chamber. The ribs 32 as well as ribs located in the associated waste stream member 30 and the uniformity of the chamber itself also add control of the anolyte flow for increased residence time. Thus, incoming water is effectively spread into the anolyte stream member 28 such that it will flow directly over the anode 12. The anode segments 24 and 26 may be set diagonally in the cavity to further enhance the close association of the anolyte with the anode 12.

Within the anode, the anolyte experiences close proximity to the anode. The electrical environment surrounding the anode is such that chlorine is produced from available chloride ions. This produced chlorine will immediately dissolve into the water and act to kill living organisms contained within the water. The environment is also one of concentrated electrical potential and current. As such, some less soluble material is able to be broken into ionic form. The concentration of current acts to further weaken and destroy living organisms in the water. Finally, passage through the anode chamber results in a reduction in pH. Cationic membranes 56 and 57 are positioned on either side of the anolyte stream member assembly. These membranes allow certain of the hydroxyl ions to migrate from the anolyte thereby lowering the pH. The local pH is also lowered from the generation of hydrochloric acid and hypochlorous acid due to the hydrolysis of the chlorine. Depending on the source of water, however, the resulting pH in the discharged anolyte may be acidic, neutral or still basic in absolute value.

In the first preferred embodiment, the anolyte exiting from the anolyte outlet 52 is conveyed from the electrodialysis purifier 10 through a passageway 58. A first turbidity filter 60 having an inlet 62 and an outlet 64 filters the fine particles remaining in the anolyte and remove the chloride, chlorine byproducts and other organic chemicals. This filter is conveniently of conventional design employing activated charcoal as filter media. The placement of this first turbidity filter following the anode helps to protect to a certain extent the filter 60. The anode has a tendency to break down particles and to kill living organisms. Therefore, the water reaching the first turbidity filter 60 has been changed in a manner intended to protect and extend the life of the filter media. Even so, the filter must be renewed periodically depending on the amount of foreign particles in the incoming water. As noted above, activated charcoal acts to remove chlorine. Therefore, the filter 60 protects downstream ion exchange resin. By avoiding oxidation of the resin, periodic bead replacement becomes unnecessary.

The arrangement with the anode preceding the first turbidity filter 60 is preferred under conditions where the impurities are not in excess of around 5,000 ppm. Chlorine tends to use up or detract from the effectiveness of the activated charcoal. Thus, when sea water or other water having a very high chloride ion content is being purified, it is advantageous not to run the anolyte through the first turbidity filter 60. Instead, the anolyte is directed to waste.

When particular caution is required to insure the oxidation of all organisms, a separate holding tank 61 is used. The holding tank is employed between the anolyte outlet 52 and the first turbidity filter 60. The holding tank may be used for retaining the anolyte in a chlorinated state for any desirable length of time, thirty minutes being commonly accepted.

Following the first turbidity filter 60, the anolyte is directed, in the first preferred embodiment, to both a water stream path and waste stream paths. These paths convey the water back through the area where an electric current is developed in the electrodialysis purifier 10. This area is defined as between the anode 12 and each of two cathodes 66 and 68. The cathodes 66 and 68 are positioned parallel to and spaced to the outer sides from the anode 12. An electrical potential is placed across the anode and the cathodes through leads 70 and 72, the anode being positive and the cathodes negative in potential. The cathodes are simple stainless steel sheets positioned an appropriate distance away from the parallel, structurally more complex anode 12 described above.

Figure 2:
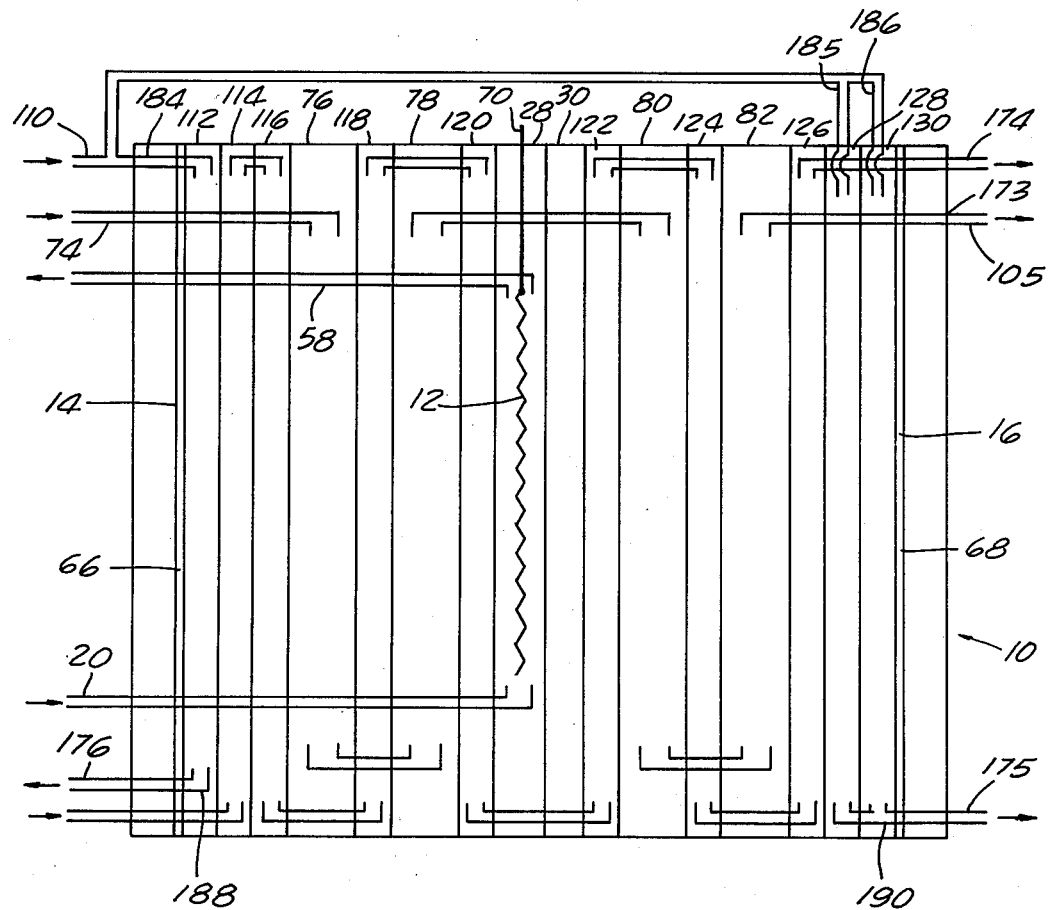
FIG. 2 is a schematic illustration of a purifier of the present invention.
Figure 3:
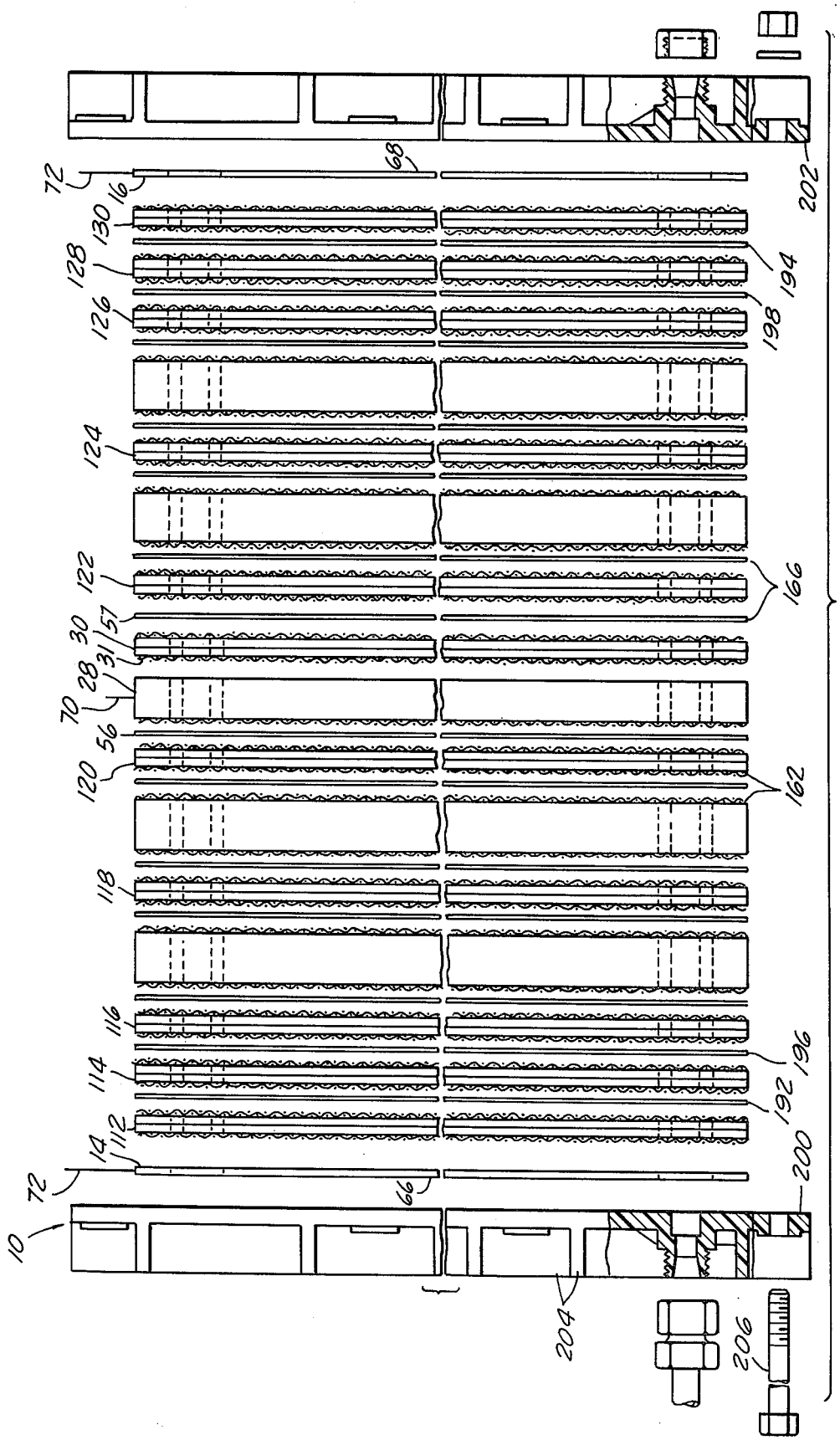
FIG. 3 is a partial exploded view of the purifier illustrated in schematic in FIG. 2.
Figure 4:
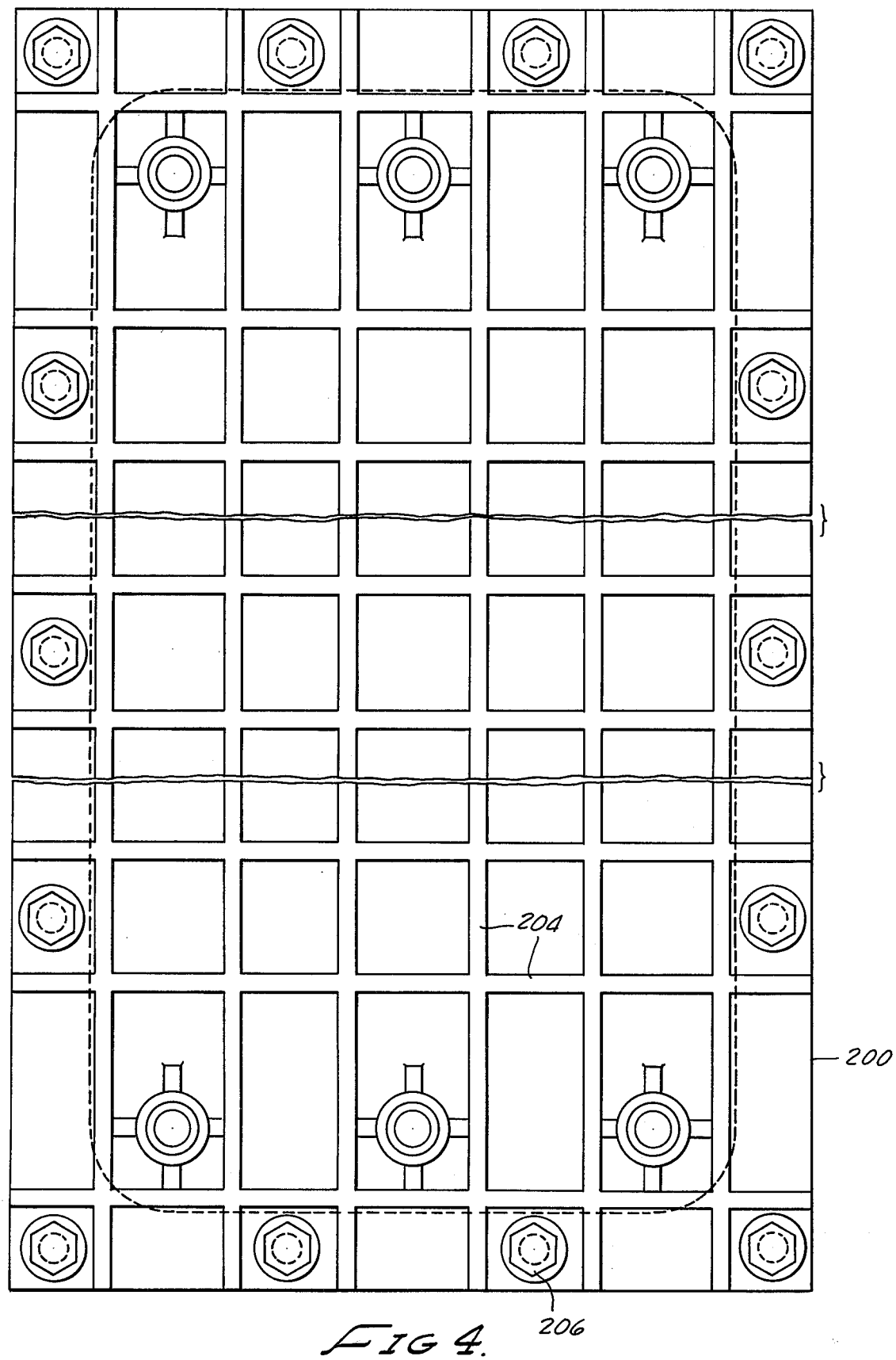
FIG. 4 is an end plate illustrated in plan of the purifier of FIG. 2.

The water stream path is in communication with the first turbidity filter 60 by means of passageway 74. In the first preferred embodiment as illustrated in FIG. 2, the water stream path is defined by four water stream members 76, 78, 80 and 82 hydraulically connected in series. These water stream members are planar in configuration and extend parallel to and between the anode 12 and either cathodes 66 and 68, two on one side of the anode and two on the other.

Figure 6:
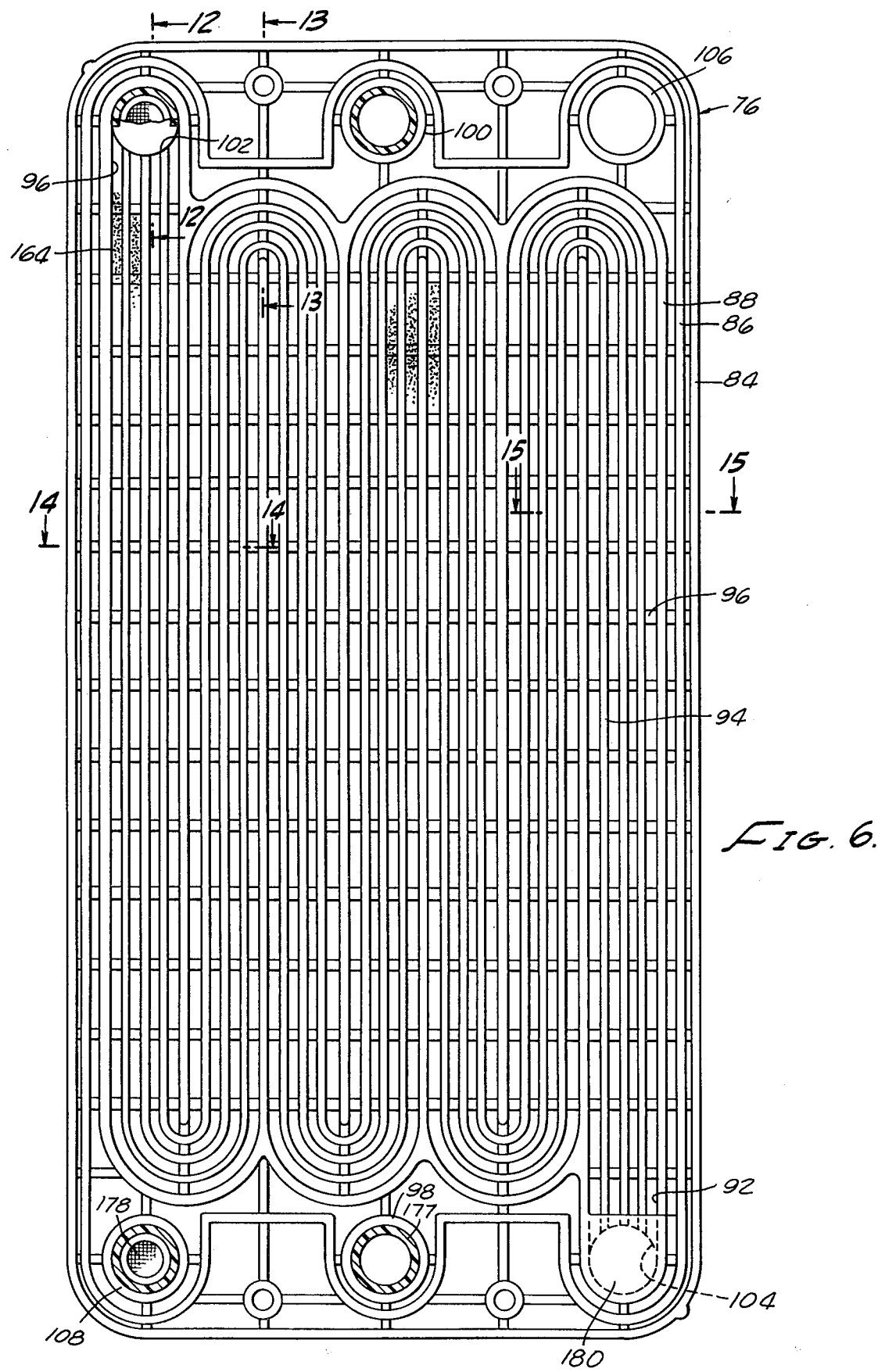
FIG. 6 is a water stream member illustrated in plan of the purifier of FIG. 2.

The water stream members 76, 78, 80 and 82 are all identical in construction for convenience of manufacturing and can best be seen by the example of the water stream member 76 illustrated in FIG. 6 as viewed from the left in FIG. 2. The construction of the water stream member 76 is not unlike the construction of the anolyte member 28. Continuous walls 84, 86 and 88 duplicate, with the exception of the innermost continuous wall 88 at the ends of the member 76, the continuous walls 34, 36 and 38 of the anolyte stream member 28. The innermost continuous wall 88 is amended so that flow may reach from the water stream member inlet 90 to the water stream member outlet 92.

Water stream ribs 94 form walls to direct the water streams in a serpentine path back and forth in the water stream member 76. Four such streams are employed in the present embodiment. The water stream member 76 also includes tie ribs 96 to maintain the ribs in proper orientation as well as the continuous outer walls.

At each end of the water stream member 76 there are located six tubes running perpendicular to the planar arrangement of the member 76. The two center tubes 98 and 100 define the anolyte passageways 20 and 58 in combination with other water stream members, with the waste stream members which include similar tubes and with the tubes 48 of the anolyte stream member 28. In two of the corners, the tubes 102 and 104 associated with the inlet 90 and outlet 92 form passageways for connection between the water stream member 76 and either the next adjacent water stream member or the outside of the unit such as through passageway 74 or water stream outlet passageway 105. In the opposite corners, tubes 106 and 108 are associated with the waste streams as will be further described below.

The anolyte water exiting from the first turbidity filter 60 also is directed by means of passageway 110 to the waste stream paths. The waste stream paths are located on either side of the water path and in the instances where two water stream members are separated by a waste stream path, the two paths of the waste stream are defined by a single flow for economy of structure. However, the criteria remains that on either side of the water stream path, a waste stream path is located so that anions may travel in one direction into a waste stream and cations may travel in the other direction into a waste stream from the water stream path.

As employed in the present invention, the waste stream structures have a plurality of functions depending on their location in the purifier 10. In the embodiment illustrated in FIGS. 2 and 3, eleven such waste stream structures are illustrated. These structures or waste stream members have been identified by numerals 30, 112, 114, 118, 120, 122, 124, 126, 128, 130. The waste stream member 30 provides additional structure and area to the anolyte stream member 28 and is not used as a waste stream at all. The waste stream members 112, 114, 116, 126, 128 and 130 are associated specifically with the cathodes 66 and 68 providing a buffer zone between the cathodes and the water stream path. Waste stream members 120 and 122 interface with the anode assembly. Waste stream members 116, 118, 120, 122, 124 and 126 each provide the required streams on either side of the water stream path, waste stream members 118 and 124 serving both cationic and anionic functions to the water stream path because of their position between adjacent water stream members.

Figure 5:
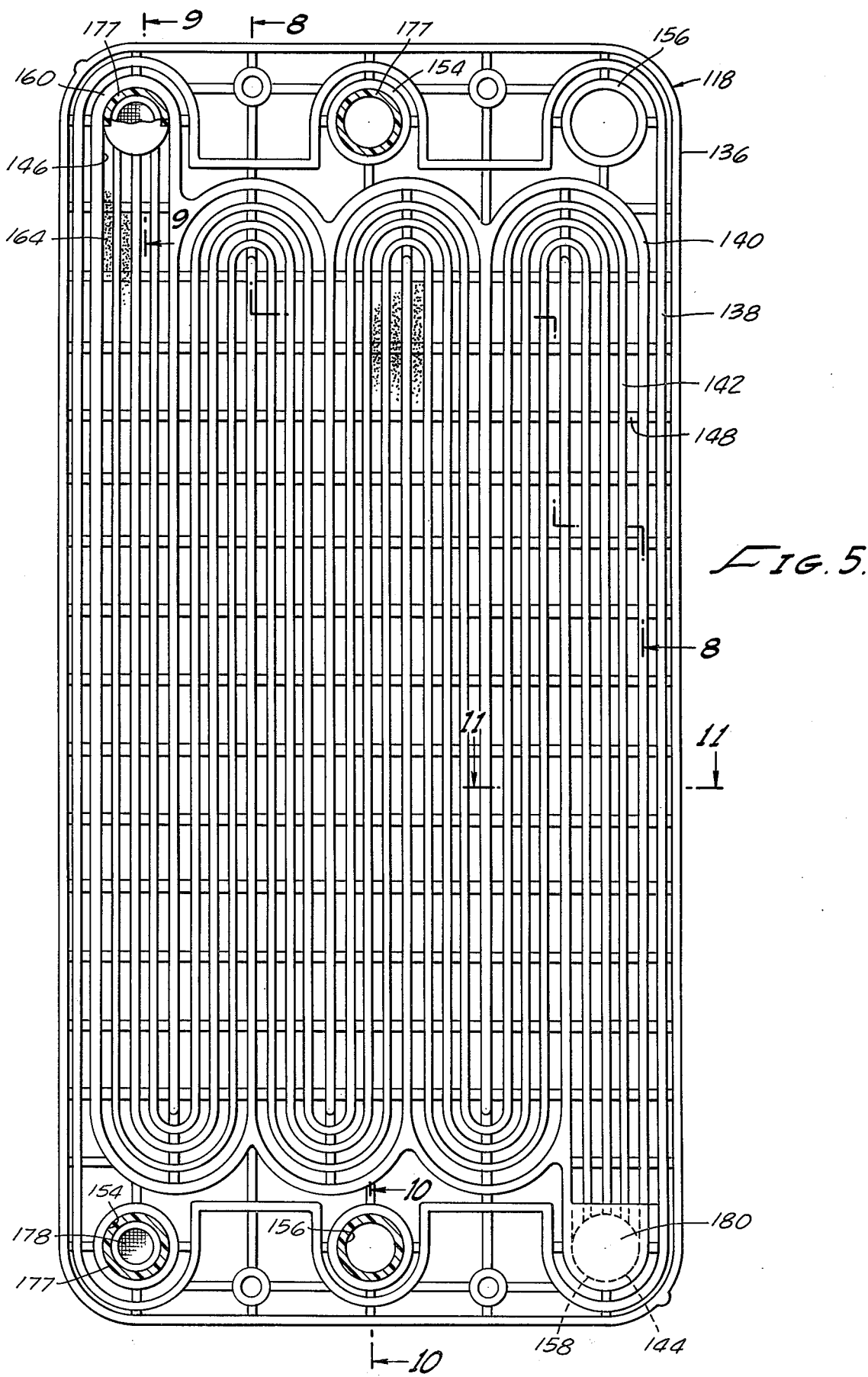
FIG. 5 is a waste stream member illustrated in plan of the purifier of FIG. 2.

The structure of each waste stream member is illustrated by example in FIG. 5 illustrating waste stream member 118 as seen from the right in FIG. 2. Because of molding requirements and the arrangement of the flow through the system, left and right hand sides of the waste stream are used. Thus, the waste stream member 118 is divided into two segments 132 and 134. The waste stream member 118 is similar to the water stream members and the anolyte stream member in that a substantially planar arrangement, three continuous walls 136, 138 and 140, ribs 142, tie ribs 148 and tubes are employed. As with the water stream members, the waste stream member 118 includes a plurality of ribs 142 which define four serpentine stream paths from an inlet 144 to an outlet 146. Tie ribs 18 perform the same function as in the other elements as do anolyte tubes 150 and 152, water stream tubes 154 and 156, and waste stream tubes 158 and 160.

The ribs 142, as with the other members, are mutually parallel and overlay the ribs in such other members along their straight lengths to provide a continuous ion path across membranes through the purifier. The innermost continuous wall 140 overlays the continuous wall 88 of the water stream members and support posts 44 of the anolyte stream member to form a continuous structural link from one side of the purifier 10 to the other. Similarly, the outer continuous walls also provide such a structural link as well as a water seal.

Associated with each water stream member, each waste stream member, and one side of the anolyte stream member are fine mesh screens. These screens, like the members, are of nonconductive plastic and extend across the full cross-section of the purifier 10. The screens 162 are bonded, conveniently through the use of hot melt adhesive or caulking sealant, to each side of the water stream members and the waste stream members and one side of the anode box. The screens 162 serve several advantageous structural functions. The interstices of the screens are small enough so that the beads cannot, even oriented to present their minor cross sectional area, pass through the screens to the membranes. Naturally, ionic elements can easily flow through such interstices. By separating the beads and the membranes, the beads cannot be forced through the membranes under either static or dynamic conditions, a substantial problem with unprotected membranes. Wear by rubbing on the membranes is also eliminated. The screens 162 act to hold the membranes flat. This eliminates surface turbulence, prevents membranes from ballooning out and bursting, and prevents bead migration associated with such membrane displacement. The screens also act to better distribute the flow to the membranes.

During fabrication, once the screens are bonded into place, ion exchange beads 164 are blown into each of the water stream members and each of the waste stream members. Only the anolyte stream member 28 is excluded. The beads 164 are commercially available weak acid beads having a porous styrene base and grafted with ion exchange sites. The anionic beads are commercially available from Rohm & Haas under the trade designation IRA 88. Cationic beads are available from the same source as IRC 84. Normally cationic beads will be employed in the waste streams and the water streams to help lower the pH in these streams. Anionic beads may be found beneficial in the last water stream member to raise the pH where desirable. Anionic beads may be generally employed or the beads may be mixed.

The ribs of the water stream members and the waste stream members are also grafted with similar active groups to provide additional ion exchange sites in the system.

Positioned between each waste stream member and each water stream member and between adjacent waste stream members are ion exchange membranes 166. These membranes 166 are very thin and are sandwiched between the screens 162. Together with the walls of the ribs of the several members, the membranes 166 form the boundaries for the water streams and the waste streams. The membranes operate in such a way that ions are capable of passing through the membrane by migrating from one ion exchange site to another. However, water and other non-ionic molecules cannot pass through the membrane 166.

Once the water has passed through the water stream members, it then is discharged substantially free of ions for a final filter step. A second turbidity filter much like the first such filter is employed to extract remaining suspended particles and materials actually created in the environment of the purifier 10. The filter media is again preferably activated charcoal. The inlet 170 to the second turbidity filter 168 is in communication with the outlet 173 from the water stream of the purifier 10. The outlet 172 from the second turbidity filter is the outlet of the system. The waste stream, on the other hand, does not pass through any further processing once leaving the last waste stream members through outlets 174, 175 and 176. Instead, this ion laden stream is conducted to waste.

To effectively isolate the impurities in the waste stream, a check valve is positioned in passageway 110. To isolate the entire system from waste, additional check valves may be employed in association with the waste stream outlets.

To maintain the several associated members in alignment and to prevent the migration of ion exchange beads from each water stream and waste stream member, alignment tubes are positioned in the tubes of the members. These alignment tubes 177 include screens 178 thereacross to prevent bead migration. The tubes are positioned as the waste stream members and water stream members are assembled and are of varying length to match the required distances. Portions of these alignment tubes are cut away at the ends to provide hydraulic communication with the members.

Looking then more to the functional aspects and arrangements of the first preferred embodiment rather than to the structural details of the components, the overall system of the purifier 10 is designed to enhance coulomb efficiency across the unit regardless of the number of ion impurities in either the water stream path or the waste stream paths. To this end, the ion exchange beads 164 are located not only in the water stream path but also, in the waste stream paths. The weak acid beads employed have an ability to increase conductivity with an increase in the number of ions adhered to the beads at the ion exchange sites. During periods when there is no water use, the beads will regenerate because of the high presence of hydrogen, hydronium and hydroxyl ions. This causes the current to decrease during such idle periods when weak acid beads are used. Thus, as the water contains less electrolytes (or starts out clean), electrical current can still pass through the ion exchange beads 164, whether this is in the water stream path or the waste stream paths. Under high ionic conditions, there is no need for the beads to enhance coulomb efficiency. Consequently, the beads may be eliminated for the portion of the system where the quantity of ions exceeds around 5000 ppm. It is only below this area where the beads tend to have a beneficial effect.

As a further factor in increasing coulomb efficiency, the purifier 10 is constructed to increase the presence of dissociated water molecules forming hydrogen and hydroxyl ions. To accompish this, the screens 162 and the walls of the members are grafted with ion exchange sites. The ion exchange sites tend to break down water into its component ions which in turn become conductive elements. The screens 162 are selected such that grafting of ion exchange sites on the streams will be the opposite of that of the membrane. That is to say, if there is an anionic membrane between two screens, the screens will be cationic. The walls of the waste stream members are also selected to be opposite from the membranes most adjacent thereto. Thus, half of the waste stream membrane includes anionic sites and half includes cationic sites. As the water stream members are not formed in two halves, a single selection should be made. The walls of the water stream members include sites opposite in sign to the beads.

The increase in the generation of water ions causes not only an increase in coulomb efficiency but also an increase in ions for regenerating the beads contained within the members. The dissociation of water creates positive hydrogen and hydronium ions and negative hydroxyl ions. These ions bring about a continuing regeneration of the ion exchange beads, the hydrogen ion regenerating cationic resins and the hydroxyl ion regenerating anionic resins. As this regeneration is continuous as is the acceptance of ion impurities by the ion exchange sites, an equilibrium is established with the exchange sites constantly working to aid the electrodialysis process.

The mechanisms for increasing coulomb efficiency, particularly the activated screens and the beads in the waste streams, appear to help keep scale from the waste stream side of the anionic membranes. It is believed that a lower pH is maintained about the anode side of the anionic membranes because of the cationic screen. It appears that the pH is reduced in the presence of such a combination of diverse ion exchange sites. Furthermore, it is believed that the cationic treatment of the screen tends to repel positive ions which cannot approach the anionic membrane to plate out in combination with hydroxyl ions. To further prevent scale, cationic beads are used in the waste streams. These beads tend to generate hydrogen and hydronium ions and lower the pH. The use of the anolyte stream in the waste streams also reduces pH. As an alternative, the product water may be used, which is also of low relative pH. However, the output is correspondingly reduced.

The specific arrangement of the paths within the water and waste stream members is designed for maximum residence time. That is to say, an effort has been made in employing the present members to prevent substantial channeling or the like which would result in a large percentage of the fluid not spending sufficient residence time within the purifier 10 to properly remove ions and kill living organisms. Both the ribs 142 and ribs 94 result in seven passes of the water lengthwise through each member. The narrowness of the passages between the ribs and membranes helps to prevent channeling.

The construction of the members also enhances optimum flow characteristics. It is advantageous for reduction of scale that no area of high hydroxyl ion concentration can develop. Consequently, it is important that flow be as uniform across the streams without pockets or eddies and that the flow move relatively briskly for such units. Because the volume of waste stream is advantageously kept to a minimum, the waste stream members are relatively thin compared to the water stream members. Thus, velocity of the fluid is increased without an increase in flow. However, very small waste streams, 0.05 inches in width is common, have a propensity to clog. With the addition of beads to the waste stream, the present system employs a width of 0.25 inches. To further avoid problems and at the same time reduce cumulative flow of waste water, a surge system has been employed as illustrated schematically in FIG. 1. This system employs a first outlet 222 having a flow restrictor 224 therein. Waste water only drips from this outlet 222. In parallel, an outlet 226 provides a higher flow but is blocked by solenoid actuated valve 228 run off a timer 230. Thus, as needed, the waste stream may experience an intermitent surge cycle. Furthermore, several of the waste streams are connected in series as can best be seen in FIG. 2. Such series operation magnifies velocity without changing flow. The same is true for the water streams as well.

Figure 16:
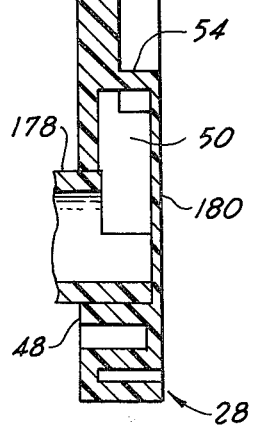
FIG. 16 is a cross-sectional side view taken along line 16—16 of FIG. 7.

To accomplish or determine the type of flow, the tubes of the various members are partially blocked by a barrier 180, as can best be seen in FIGS. 9, 12 and 16. This forces all of the flow through the supply passageways to flow through the member for each of the waste stream members, the water stream members or the anolyte stream member. Another barrier is provided at the outlet to prevent flow back toward a preceding member. In this way, series operation can be achieved.

Looking specifically to the areas of the cathodes 66 and 68, a buffer zone is created to avoid scaling problems so prevalent adjacent to cathodes in most electrodialysis equipment. As a first means for inhibiting scale, the outermost waste stream members 112 and 130 and the waste stream member 128 are placed in parallel flow to the remaining waste stream system. Thus, separate inlets 184, 185 and 186 and outlets 188 and 190 are required specifically for these waste stream members. The waste stream member 114 receives fresh anolyte and may be included in the series system. The use of a parallel system reduces the amount of ions directly exposed to the cathode where substantial amounts of hydroxyl ion are generated. Thus, the chance for scale is reduced.

The first membranes 192 and 194 inwardly from the cathodes 66 and 68 are cationic. That is to say, they will not pass the hydroxyl anion. Thus, the hydroxyl ion is retained in the substantially fresh stream adjacent the cathode. To prevent a combination of cations with the high concentration of hydroxyl ions adjacent the cathode, a waste stream spacing member 114 and 128 is positioned adjacent the cationic membrane 192 and 194 followed by an anionic membrane 196 and 198. Thus, a buffer zone is created to provide a substantial separation of major amounts of cations and the hydroxyl ions generated at the cathode. Scaling is thereby reduced and substantially eliminated.

The progression of membranes through the system is certainly apparent to one of ordinary skill in the art of electrodialysis purification. However, for sake of clarity, it is observed that on the cathode side of the waste stream members 116, 118, 120, 122, 124 and 126 the ion exchange members are anionic. Conversely, the opposite sides of such members are adjacent cationic membranes. Therefore, migrating ions are trapped in the waste streams for removal.

The entire assembly of members, screens, membranes and beads are all held together by means of two end plates 200 and 202. To prevent leakage, compression is placed on the structure by these end plates. These end plates 200 and 202 must hold the system in compression against substantial water pressure contained therein. Consequently, structural ribs 204 are employed for added strength. To retain the end plates 200 and 202 toward one another, fasteners 206 are used. These fasteners lie around the periphery of the members positioned between the end plates. An external cover may also be employed for appearance's sake.

Figure 19:
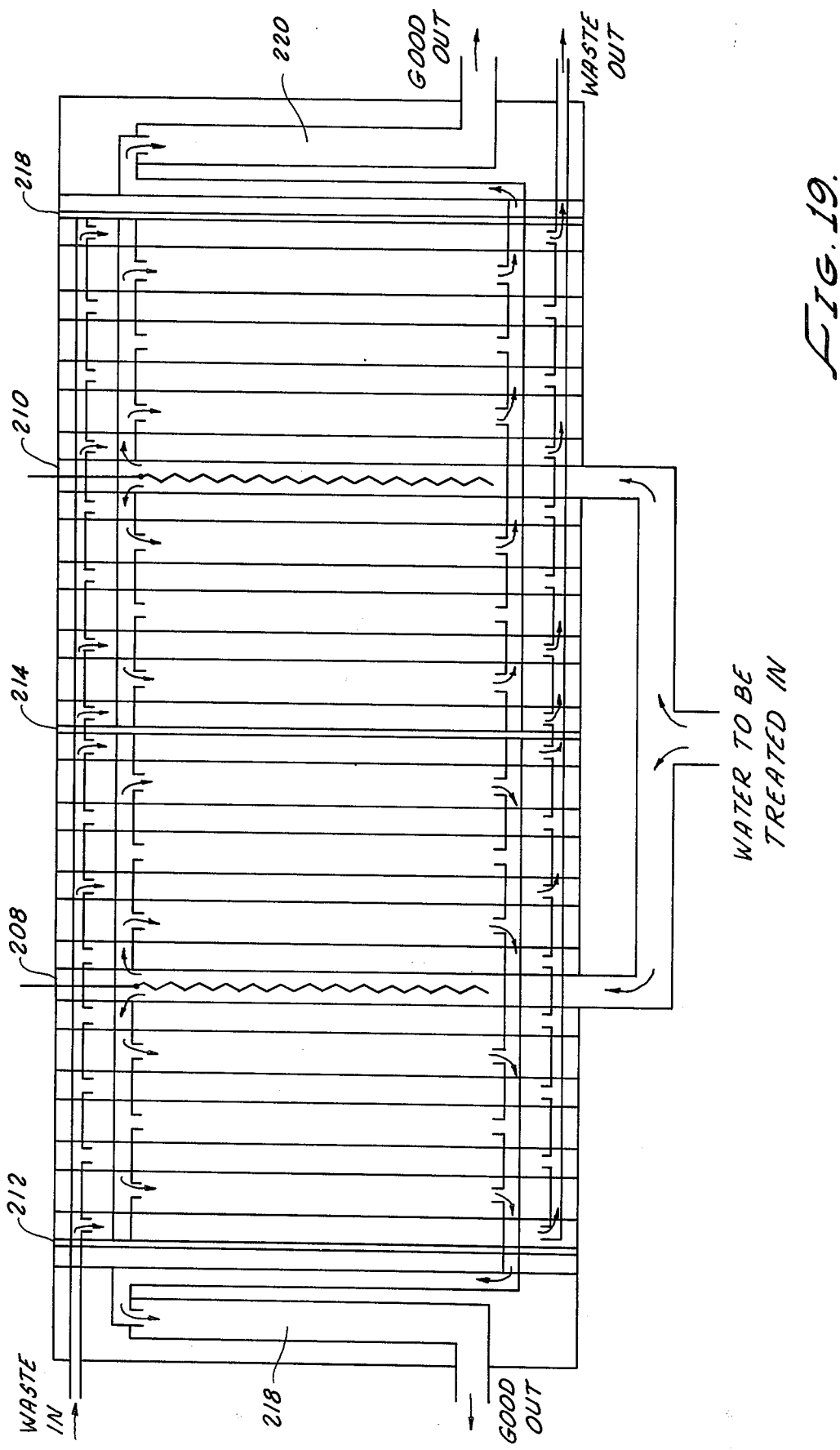
FIG. 19 is a second embodiment of a water purifier illustrated schematically.

In an alternate embodiment contemplated for use with large capacity systems, FIG. 19, a plurality of anodes 208 and 210 are employed with three cathodes 212, 214 and 216. Additionally, the size of the unit and the amount of flow makes possible a parallel system for both the water stream and the waste streams. Such a unit might also incorporate associated turbidity filters 218 and 220 for the final filtering operation. These turbidity filters on the outlet end of the water purifier are substantially protected from the incoming flow and do not require substantial maintenance.

Looking to the chemical makeup of the various components which have been found to be advantageously employed in the present invention, the majority of the unit is made of polyethylene plastic. This includes the water stream members, the waste stream members, the anolyte stream member, the screens, the membranes, and the alignment tubes. Because of the additional strength required in the end plates 200 and 202, they are to be made of polycarbonate. The cationic membranes, beads and structural surfaces have attached to the polyethylene pendent sulphonic acid groups. For the anionic sites, the polyethylene has pendent quarternary amine salts.

Thus, an improved water purification system has been disclosed which requires minimal maintenance, provides complete purification, and requires minimum investment and operation expense. While embodiments and applications of this application have been shown and described, it would be apparent to those skilled in the art that many more modifications are possible without departing from the inventive concepts herein. The invention, therefore, is not to be restricted except by the spirit of the appended claims.

What is claimed is:

1. A method for water purification employing an electrodialysis purifier having an anode, a cathode, a water stream path positioned therebetween, and electrodialysis membranes around the water stream path, comprising the steps of
    passing water to be purified directly over the anode;
    passing the resulting anolyte through a first turbidity filter; and
    passing the water from the first turbidity filter through the water stream path of the electrodialysis purifier.

2. A method for water purification employing an electrodialysis purifier having an anode, a cathode, a water stream path positioned therebetween, and electrodialysis membranes around the water stream path, comprising the steps of
    passing water to be purified directly over the anode;
    passing the resulting anolyte through a first turbidity filter of activated charcoal; and
    passing the water from the first turbidity filter through the water stream path of the electrodialysis purifier.

3. The method of claim 1 or 2 further comprising the step of passing the water from the water stream path of the electrodialysis purifier through a second turbidity filter.

4. A method for water purification employing an electrodialysis purifier having an anode, a cathode, a water stream path positioned therebetween, and electrodialysis membranes around the water stream path, comprising the steps of
    passing water to be purified through a first turbidity filter;
    passing the water from the first turbidity filter through the water stream path of the electrodialysis purifier; and
    passing the water from the water stream path through a second turbidity filter.

5. The method of claims 1, 2 or 4 further comprising the steps of directing anolyte to at least one waste stream path positioned adjacent the membranes on the side of the water stream path and passing the water in the water streams over ion exchange beads contained within the waste stream paths.

6. A method for water purification employing an electrodialysis purifier having an anode, a cathode, a water stream path, electrodialysis membranes around the water stream path, and waste streams positioned adjacent the membranes comprising the steps of
    passing water to be purified directly over the anode;
    passing the resulting anolyte through a first turbidity filter;
    directing anolyte through the waste streams;
    passing the water from the first turbidity filter through the water stream path of the electrodialysis purifier; and
    passing the water from the water stream path of the electrodialysis purifier through a second turbidity filter.

7. The method of claims 1, 2, 4 or 6 wherein the electrodialysis purifier has ion exchange beads in the water stream path, the step of passing the water through the water stream path includes passing the water over the ion exchange beads contained within the water stream path.

8. The method of claims 1, 2, or 6 further comprising the step of passing water to be purified through a particle filter before the step of passing the water directly over the anode.

9. A water purification system, comprising
    an electrodialysis purifier having an anode, a cathode spaced from said anode, a water stream path positioned between said anode and said cathode, waste stream paths on either side of said water stream path, and ion exchange membranes between said waste stream paths and said water stream path and between one said waste stream path and said anode, each of said anode, said water stream path, and said waste stream paths including an inlet and an outlet;
    a first turbidity filter having an inlet, an outlet and filter media, said first turbidity filter inlet being in communication with said anode outlet, said first turbidity filter outlet being in communication with said water stream path inlet.

10. A water purification system, comprising an electrodialysis purifier having an anode, a cathode spaced from said anode, a water stream path positioned between said anode and said cathode, waste stream paths on either side of said water stream path, and ion exchange membranes between said waste stream paths and said water stream path and between one said waste stream path and said anode, each of said anode, said water stream path, and said waste stream paths including an inlet and an outlet;

a first turbidity filter having an inlet, an outlet and filter media of activated charcoal, said first turbidity filter inlet being in communication with said anode outlet, said first turbidity filter outlet being in communication with said water stream path inlet.

11. The water purification system of claim 9 or 10 further comprising a second turbidity filter having an inlet, an outlet and filter media, said second turbidity filter inlet being in communication with said water stream path outlet.

12. A water purification system, comprising
an electrodialysis purifier having an anode, a cathode spaced from said anode, a water stream path located between said anode and said cathode, waste stream paths on either side of said water stream path, and ion exchange membranes separating said waste stream path most adjacent said anode from said anode, said water stream path, said waste stream paths, and said anode each having an inlet and an outlet;

a first turbidity filter having an inlet, an outlet and filter media, said first turbidity filter outlet being in communication with said water stream path inlet; and a second turbidity filter including an inlet, an outlet and filter media, said second turbidity filter inlet being in communication with said water stream path outlet.

13. The water purification system of claims 9, 10, or 12 wherein said anode outlet is in communication with at least one said waste stream path inlet.

14. The water purification system of claim 13 wherein said first turbidity filter is located between said anode outlet and said waste stream path inlets in communication with said anode outlet.

15. A water purification system, comprising
an electrodialysis purifier having an anode, a cathode spaced from said anode, a water stream path positioned between said anode and said cathode, waste stream paths on either side of said water stream path and between said anode and said cathode, ion exchange membranes separating each waste stream path from said water stream path and said waste stream path most adjacent said anode from said anode, said anode, said waste stream paths, and said water stream path each having an inlet and an outlet;

a first turbidity filter having an inlet, an outlet and filter media; and a second turbidity filter having an inlet, an outlet and filter media, said anode outlet being in communication with said first turbidity filter inlet, said first turbidity filter outlet being in communication with said water stream path inlet, said anode outlet being in communication with at least one said waste stream path inlet, said water stream path outlet being in communication with said second turbidity filter inlet.

16. The water purification system of claim 15 wherein said first turbidity filter is positioned between said anode outlet and said waste stream path inlets in communication with said anode outlet.

17. The water purification system of claims 9, 10, 12 or 15 further comprising ion exchange beads positioned in said water stream path.

18. The water purification system of claim 9, 10, 12 or 15 further comprising ion exchange beads in said water stream path and ion exchange beads in at least one of said waste stream paths.

19. An electrodialysis purifier, comprising
an anode;
a cathode spaced from said anode;
a water stream path having walls defining a water stream conduit;
waste stream paths having walls defining waste stream conduits on either side of said water stream conduit and between said anode and said cathode;
ion exchange beads in said water stream conduit;
ion exchange membranes between said waste stream conduit and said water stream conduit; and
screens between each said waste stream conduit and each said membrane adjacent said waste stream conduit and between said water stream conduit and each said membrane adjacent said water stream conduit, said screens having interstices smaller than the minor cross-sectional areas of said ion exchange beads.

20. The electrodialysis purifier of claim 19 wherein said screens are bonded to each side of said waste stream paths and to each side of said water stream path adjacent said membranes.

21. The electrodialysis purifier of claim 19 wherein said screens are grafted with ion exchange sites.

22. The electrodialysis purifier of claim 21 wherein said ion exchange sites are opposite in sign from the most adjacent said ion exchange membrane.

23. The electrodialysis purifier of claim 19 further comprising a grafting of ion exchange sites on the waste stream walls and the water stream walls.

24. The electrodialysis purifier of claim 19 further comprising ion exchange beads located in at least one said waste stream conduit.

25. The electrodialysis purifier of claim 19 wherein a plurality of said waste stream paths are connected in series.

26. An electrodialysis purifier, comprising
an anode;
a cathode spaced from said anode;
a water stream path having walls defining a water stream conduit;
waste stream paths having walls defining waste stream conduits on either side of said water stream conduit and between said anode and said cathode;
ion exchange beads in said water stream conduit;
ion exchange membranes between said waste stream conduit and said water stream conduit; and
ion exchange beads in a plurality of said waste stream conduit.

27. The electrodialysis purifier of claim 26 wherein said ion exchange beads in said waste stream conduit are cationic.

28. The electrodialysis purifier of claim 26 wherein said walls of all said water stream path and said waste stream paths are grafted with ion exchange sites.

29. The electrodialysis purifier of claim 26, 27, or 28 further including screens between each said waste stream conduit and each said membrane adjacent said waste stream conduit and between said water stream conduit and each said membrane adjacent said water stream conduit, said screens being grafted with ion exchange sites.

30. The electrodialysis purifier of claim 29 wherein said screens are grafted with sites opposite in sign from the most adjacent ion exchange membrane.

31. An electrodialysis purifier, comprising
a water stream outlet, and a plurality of water stream ribs, said water stream ribs being mutually parallel and extending from said water stream inlet to said water stream outlet defining water stream conduits therebetween, said water stream ribs lying in a planar arrangements;
waste stream members positioned on either side of said water stream member, each said waste stream member having a waste stream inlet, a waste stream outlet and a plurality of waste stream ribs, said waste stream ribs being mutually parallel and extending from said waste stream inlet to said waste stream outlet defining waste stream conduits therebetween, said waste stream ribs lying in a planar arrangement and being laterally positioned to overlay the water stream ribs through a substantial portion of their length;
ion exchange membranes positioned between each said waste stream member and said water stream member, said membranes separating said waste stream conduits from said water streams,
an anode on a first side of the assembly of said water stream member and said waste stream members;
a cathode on a second, opposite side of the assembly of said water stream member and said waste stream members.

32. The electrodialysis purifier of claim 31 further comprising an anolyte stream member having an anolyte inlet, an anolyte outlet, an internal cavity for containing said anode and defining an anolyte stream conduit and structural member aligned with said ribs of said other members; and
an additional ion exchange member positioned between said anolyte member and one said waste stream member to separate said anolyte stream conduit from said waste stream conduit of said adjacent waste stream member.

33. The electrodialysis purifier of claim 31 further comprising screens positioned immediately adjacent and on either side of said ion exchange membrane.

34. The electrodialysis purifier of claim 33 wherein said screens are bonded to each side of said water stream member and each side of said waste stream members.

35. The electrodialysis purifier of claim 33 wherein said screens are grafted with ion exchange sites.

36. The electrodialysis purifier of claim 33 wherein said ion exchange sites are opposite in sign from the most adjacent membrane.

37. The electrodialysis purifier of claim 31 wherein said water stream ribs include grafted ion exchange sites thereon.

38. The electrodialysis purifier of claim 37 further comprising grafted ion exchange sites on said waste stream ribs.

39. The electrodialysis purifier of claim 31 wherein said water stream conduits include ion exchange beads positioned therein.

40. The electrodialysis purifier of claim 39 wherein said waste stream conduit include ion exchange beads contained therein.

41. The electrodialysis purifier of claim 31 further comprising two end plates positioned outwardly of said water stream member, said waste stream members, said anode, said cathode, and said membranes to hold and support same together, said end plates including fasteners extending therebetween to hold said end plates toward one another.

42. The electrodialysis purifier of claim 31 wherein said anode is an expanded grid of niobium plated with a metal oxide selected from the group consisting of lead dioxide and manganese dioxide.

43. An electrodialysis purifier, comprising
a water stream member having a water stream inlet, a water stream outlet, and a plurality of water stream ribs, said water stream ribs being mutually parallel and extending from said water stream inlet to said water stream outlet, defining water stream conduits therebetween, said water stream ribs lying in a planar arrangement;
waste stream members positioned on either side of said water stream member and having a waste stream inlet, a waste stream outlet and a plurality of waste stream ribs, said waste stream ribs being mutually parallel and extending from said waste stream inlet to said waste stream outlet defining waste stream conduits therebetween, said waste stream ribs lying in a planar arrangement and being laterally positioned to overlay the waste stream ribs through a substantial portion of their length;
screens positioned on either side of said water stream member parallel to the planar arrangement;
ion exchange membranes positioned between each waste stream member and water stream member, said membranes separating said waste stream conduits from said water stream conduits;
ion exchange beads positioned within said water stream conduits and said waste stream conduits;
an anode on one side of the assembly of said water stream member and said waste stream members; and
a cathode on the other side of the assembly of said water stream member and said waste stream members.

44. The electrodialysis purifier of claim 43 further comprising additional said waste stream members, water stream members, ion exchange membranes, screens, and ion exchange beads positioned between said anode and said cathode.

45. The electrodialysis purifier of claim 44 further comprising a second cathode positioned on the opposite side of said anode from said first cathode, and additional said water stream members, waste stream members, ion exchange membranes, screens and ion exchange beads between said anode and said second cathode.

46. The electrodialysis purifier of claims 43, 44 or 45 wherein said waste stream conduits are hydraulically arranged in series.

47. The electrodialysis purifier of claim 31 or 43 further comprising alignment tubes extending between said members, said tubes being hollow to conduct flow between said members.

48. An electrodialysis purifier cathode buffer for a cathode, comprising
a cationic exchange membrane positioned adjacent and spaced from the cathode defining a first waste stream buffer conduit between said cationic exchange membrane and the cathode;

an anionic exchange membrane positioned adjacent and spaced from said cationic exchange membrane further removed from the cathode defining a second waste stream buffer conduit between said cationic exchange membrane and said anionic exchange membrane.

49. An electrodialysis purifier, comprising an anode;

a cathode spaced from said anode;

a water stream path having walls defining a water stream conduit;

waste stream paths having walls defining waste stream conduits on either side of said water stream conduit and between said anode and said cathode; and a cathode buffer including a cationic exchange membrane positioned adjacent and spaced from said cathode defining a first waste stream buffer conduit therebetween and an anionic exchange membrane positioned adjacent and spaced from said cationic exchange membrane defining a second waste stream buffer conduit therebetween further removed from said cathode.

50. The electrodialysis purifier of claim 49 further comprising an anolyte waste stream conduit at said anode, said anolyte waste stream being in communication with said first waste stream buffer conduit and being in communication with said second waste stream buffer conduit for anolyte flow to each said buffer conduit.

51. The electrodialysis purifier of claim 49 wherein said water stream path is in communication with said first waste stream buffer conduit and is in communication with said second waste stream buffer conduit for product water flow to each said buffer conduit.

52. An electrodialysis purifier, comprising an anode;

a cathode spaced from said anode;

a water stream path having walls defining a water stream conduit;

waste stream paths having walls defining waste stream conduits on either side of said water stream conduit and between said anode and said cathode;

ion exchange membranes between said waste steam conduit and said water stream conduit;

a surge system associated with said waste stream paths, said surge system including a first and second outlet connected in parallel, said first outlet including a flow restrictor and said outlet including a valve means, said second outlet having less restrictions than said first outlet with said restrictor when said valve means is open.

* * * * *

UNITED STATES PATENT AND TRADEMARK OFFICE
CERTIFICATE OF CORRECTION

PATENT NO. : 4,465,573
DATED : August 14, 1984
INVENTOR(S) : HARRY M. O'HARE

It is certified that error appears in the above—identified patent and that said Letters Patent is hereby corrected as shown below:

In column 17, line 10, after "water stream", insert before "a water stream outlet", -- a water stream member having a water stream inlet, --.

In column 17, line 57, delete "33" and insert therefor -- 35 --.

In column 18, line 2, delete "conduit" and insert therefor -- conduits --.

In column 20, line 19, delete "steam" and insert therefor -- stream --.

Signed and Sealed this

Twenty-second Day of January 1985

[SEAL]

Attest:

DONALD J. QUIGG

Attesting Officer

Acting Commissioner of Patents and Trademarks